United States Patent [19]

Hunter

[11] Patent Number: 4,738,299

[45] Date of Patent: Apr. 19, 1988

[54] GUIDE SLIPPER FOR MATCHPLATE MOLD MAKING MACHINE

[75] Inventor: William A. Hunter, Inverness, Ill.

[73] Assignee: Hunter Automated Machinery Corporation, Schaumburg, Ill.

[21] Appl. No.: 36,824

[22] Filed: Apr. 10, 1987

Related U.S. Application Data

[63] Continuation-in-part of Ser. No. 776,099, Sep. 16, 1985, Pat. No. 4,657,064, which is a continuation of Ser. No. 685,166, Dec. 21, 1984, abandoned.

[51] Int. Cl.⁴ .................. B22C 17/00; B22C 21/10
[52] U.S. Cl. .................... 164/169; 164/182;
    164/388; 384/38; 384/40; 384/42; 384/624
[58] Field of Search ............. 164/169, 182, 183, 187,
    164/188, 412, 37, 44, 388; 425/423, 431;
    384/38, 40, 42, 624

[56] References Cited

U.S. PATENT DOCUMENTS

| | | | |
|---|---|---|---|
| 1,561,500 | 11/1925 | Wood | 164/182 |
| 3,229,336 | 1/1966 | Hunter et al. | 164/182 |
| 3,342,253 | 9/1967 | Hunter | 164/374 |
| 3,406,738 | 10/1968 | Hunter | 164/182 |
| 3,506,058 | 4/1970 | Hunter | 164/37 |
| 3,516,475 | 6/1970 | Dougherty | 164/37 |
| 3,519,058 | 7/1970 | Young | 164/187 |
| 3,550,670 | 12/1970 | Greenwald | 164/37 |
| 3,556,196 | 1/1971 | Buhler | 164/182 |
| 3,589,434 | 6/1971 | Kleinbagauer et al. | 164/182 |
| 3,648,759 | 3/1972 | Lund et al. | 164/182 |
| 3,824,060 | 7/1974 | Helmvich et al. | 425/423 |
| 4,108,234 | 8/1978 | Shine | 164/182 |
| 4,114,677 | 9/1978 | Wernli | 164/183 |
| 4,463,794 | 8/1984 | Shioda | 164/182 |

Primary Examiner—Nicholas P. Godici
Assistant Examiner—Samuel M. Heinrich
Attorney, Agent, or Firm—Leydig, Voit & Mayer

[57] ABSTRACT

A bearing slipper for supporting a component of a matchplate mold-making machine for back and forth sliding along an elongated rail. The slipper comprises a rigid mounting block having one face covered wholly or partially by pad means made of tough anti-friction material. Resiliently yieldable elastomeric strips are compressed in grooves at opposite end portions of the block and urge the end portions of the pad means outwardly so as to form protruding fins which wipe sand from the rail as the slipper moves back and forth along the rail.

6 Claims, 1 Drawing Sheet

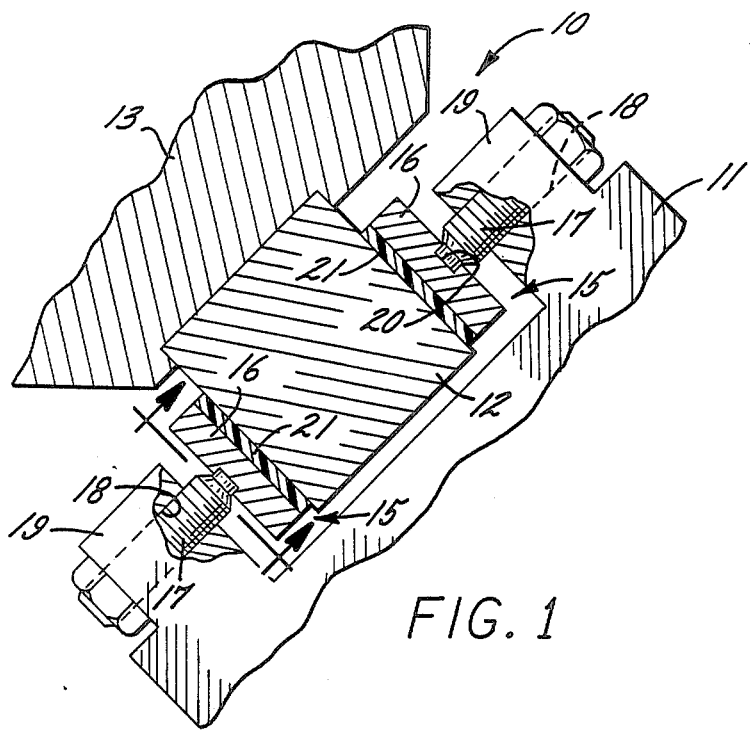
FIG. 1
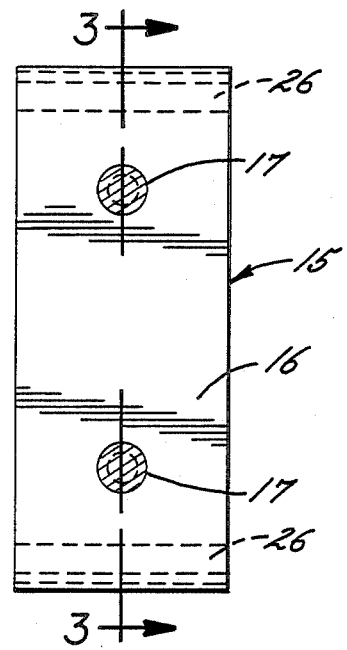
FIG. 2
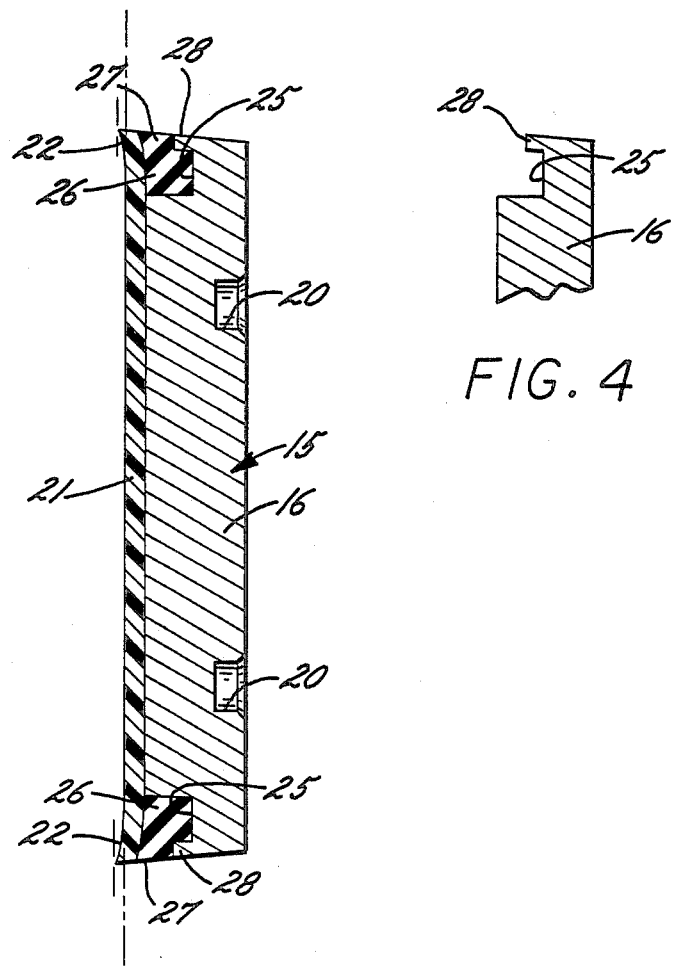
FIG. 3
FIG. 4
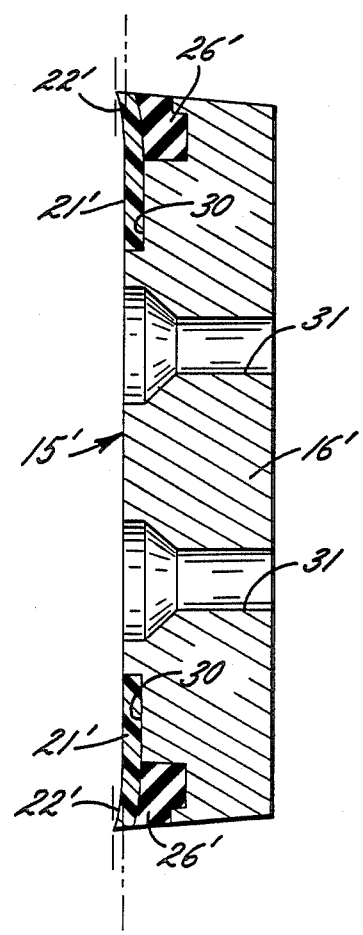
FIG. 5

GUIDE SLIPPER FOR MATCHPLATE MOLD MAKING MACHINE

CROSS-REFERENCE TO RELATED APPLICATIONS

This application is a continuation-in-part of my co-pending application Ser. No. 776,099, filed Sept. 16, 1985, now U.S. Pat. No. 4,657,064, which, in turn, is a continuation of my application Ser. No. 685,166, filed Dec. 21, 1984 and now abandoned.

BACKGROUND OF THE INVENTION

The present invention relates to a matchplate mold making machine for forming casting molds from green sand. More particularly, the invention relates to a mold making machine of the type in which various components of the machine (e.g., the molding flasks and the squeeze platen) move along elongated rails. A mold making machine of this type is disclosed in Hunter U.S. Pat. No. 3,342,253. In that machine, rollers are attached to the various components and roll along the rails. Because of vibration and other factors, the rollers and the rails wear, and grooves ultimately are formed in the rails.

To reduce wear and the need for frequent replacement of the rails, it has been proposed to equip the components of the machines with sliding bearings or "slippers" which replace the conventionally-used rollers. My aforementioned application Ser. No. 776,099 discloses a slipper made of two members, namely, a mounting member and a bearing pad member. The bearing pad is made of a somewhat flexible but very tough anti-friction material. Resiliently yieldable wipers are located adjacent the ends of the pad and remove sand from the rail to reduce the possibility of the pad being abraded away by sand as the slipper moves along the rail.

SUMMARY OF THE INVENTION

The general aim of the present invention is to eliminate the need for separate wipers at the ends of the slipper and to use the end portions of the bearing pad itself to wipe sand from the rails.

A more detailed object of the invention is to achieve the foregoing by constructing the slipper such that end portions of the bearing pad are flexed outwardly and form protruding wiping fins for removing sand from the rails.

The invention also resides in the novel use of resiliently yieldable strips to urge the end portions of the pad outwardly so that such end portions may effectively serve as wipers.

These and other objects and advantages of the invention will become more apparent from the following detailed description when taken in conjunction with the accompanying drawings.

BRIEF DESCRIPTION OF THE DRAWINGS

FIG. 1 is a cross-section taken through the rail of a matchplate mold making machine and shows one embodiment of a new and improved slipper for mounting a component of the machine for movement along the rail.

FIG. 2 is a cross-section taken along the line 2—2 of FIG. 1.

FIG. 3 is an enlarged cross-section taken along the line 3—3 of FIG. 2.

FIG. 4 is a partial view of the slipper shown in FIG. 3 but shows the resilient strip removed for purposes of clarity.

FIG. 5 is a view similar to FIG. 3 but shows another version of the slipper.

DETAILED DESCRIPTION OF THE PREFERRED EMBODIMENTS

For purposes of illustration, the invention is shown in conjunction with a matchplate molding machine 10 for making green sand molds. An overall machine of this general type is disclosed in the above-identified Hunter '253 Patent, the disclosure of which is incorporated herein by reference.

An understanding of the construction and operation of the overall mold making machine 10 is not necessary to an understanding of the present invention. It will suffice to say that various components of the machine move along elongated rails as the molds are formed. One such component may be a molding flask 11 which is adapted to move upwardly and downwardly along a vertical rail 12 secured to a vertical column 13.

To mount the flask 11 for up and down sliding on the rail 13, two sliding bearings or so-called slippers 15 are associated with each corner of the flask. One slipper 15 of each pair slides against one side of the rail 12 while the other slipper of the pair slides against the opposite side of the rail. The slippers thus allow the flask 11 to slide vertically but captivate the flask against lateral movement.

Each slipper 15 is defined by a supporting member in the form of a generally rectangular block 16 having flat faces. Each block is located along one side of the rail 12 and is supported by two vertically spaced fasteners 17. Herein, each fastener is in the form of a dog-point set screw which is threaded through a hole 18 in a flange 19 at the corner of the flask 11. The reduced-diameter end of each set screw projects into a hole or socket 20 (FIGS. 2 and 3) formed in the adjacent face of the block 16. Thus, the screws captivate the block for vertical movement with the flask 11 and, by adjusting the screws, the slipper 15 may be located in tight but sliding contact with the rail 12.

A pad 21 (FIG. 3) of tough anti-friction material (e.g., "Teflon" impregnated with brass) is bonded to one face of each block 16 and defines a bearing surface which rides against the rail 12. In the embodiment of the slipper shown in FIGS. 1 to 4, the anti-friction pad extends along the full length of the block.

In accordance with the present invention, the end portions of each bearing pad 21 are urged outwardly and define fins 22 (FIG. 3) which wipe the rail 12 clean of sand so as to prevent the sand from abrading and eating away the main bearing face of the strip. For this purpose, generally J-shaped grooves 25 are formed in the upper and lower end portions of the inboard face of each block 16. Bonded within each groove by a suitable adhesive is a strip 26 of resiliently yieldable material such as urethane. Each strip 26 is sized and shaped so as to flex the adjacent end portion of the pad 21 away from the block 16 and thereby form the wiper fin 22 at the end of the pad. As shown in FIGS. 3 and 4, a portion 27 of each strip 26 is located in a cut-away portion 28 of the block 16 so as to enable the strip to engage the extreme end of the pad 21 while still remaining captivated in the groove 25. The strips are resiliently compressed between the grooves and the pad.

A modified slipper 15' is shown in FIG. 5 in which parts corresponding to parts of the slipper 15 of the first embodiment are indicated by the same but primed reference numerals. The slipper 15' is identical to the slipper 15 except that only the end portions of the block 16' are covered by bearing pads 21', the pads being seated in recesses 30 in the block. Also, two countersunk holes 31 for receiving mounting screws (not shown) are located between the pads and extend completely through the block.

I claim:

1. Apparatus for mounting a component of a matchplate mold making machine for sliding movement along an elongated rail, said apparatus comprising a supporting member having opposite end portions and having a substantially flat face, means for securing said supporting member to said component, flexible pad means of anti-friction material secured to the face of said supporting member, said pad means having end portions located adjacent the end portions of said supporting member, and resiliently yieldable means located at opposite end portions of said supporting member and urging said end portions of said pad means away from said supporting member so as to form protruding wiping fins at the end portions of said pad means.

2. Apparatus as defined in claim 1 in which said pad means comprise a single piece of anti-friction material covering substantially the entire area of said face of said supporting member.

3. Apparatus as defined in claim 1 in which said pad means comprise two pieces of anti-friction material spaced from one another along said face of said supporting member, one end portion of each piece being located adjacent one end portion of said supporting member.

4. Apparatus as defined in claim 1 in which said resiliently yieldable means comprise strips of elastomeric material.

5. Apparatus as defined in claim 4 further including grooves formed in said face of said supporting member at opposite end portions of said supporting member, said elastomeric strips being located in said grooves and being compressed between said grooves and said pad means.

6. Apparatus for mounting a component of a matchplate mold making machine for sliding movement along an elongated rail, said apparatus comprising a supporting member having opposite end portions and having a substantially flat face, means for securing said supporting member to said component, flexible pad means of anti-friction material secured to the face of said supporting member, said pad means having end portions located adjacent the end portions of said supporting members, grooves formed in said face of said supporting member adjacent the end portions thereof, and resiliently yieldable elastomeric strips located in said grooves, said strips being compressed between said grooves and the end portions of said pad means and urging the end portions of said pad means away from said supporting member so as to form protruding wiping fins at the end portions of said pad means.

* * * * *